United States Patent [19]
Pickel

[11] 3,732,905
[45] May 15, 1973

[54] TREE STUMP REMOVING APPARATUS

[76] Inventor: James M. Pickel, 6714 Corrington, Kansas City, Mo. 64133

[22] Filed: Oct. 26, 1971

[21] Appl. No.: 192,517

[52] U.S. Cl. ................................................144/2 Z
[51] Int. Cl. ............................................A01g 23/06
[58] Field of Search ......................144/2 N, 2 R, 235

[56] References Cited

UNITED STATES PATENTS

| | | | |
|---|---|---|---|
| 3,308,860 | 3/1967 | DeShano | 144/2 N |
| 2,887,134 | 5/1959 | Bartlett | 144/2 N |
| 2,992,664 | 7/1961 | DeShano | 144/235 |

Primary Examiner—Donald R. Schran
Attorney—Claude A. Fishburn

[57] ABSTRACT

A tree stump removing apparatus operatively connected to a prime mover includes a support frame and an elongated arm having one end pivotally mounted on the support frame and extending outwardly therefrom and having a wood cutting blade rotatably mounted adjacent a free end of the arm. A member effects selected movement of the arm and cutting blade thereon in an arc about the one end of the arm during rotation of the cutting blade. The cutting blade has a plurality of circumferentially spaced cutting elements on opposite faces thereof to cut a tree stump during swinging movement of the arm about the one end thereof.

2 Claims, 8 Drawing Figures

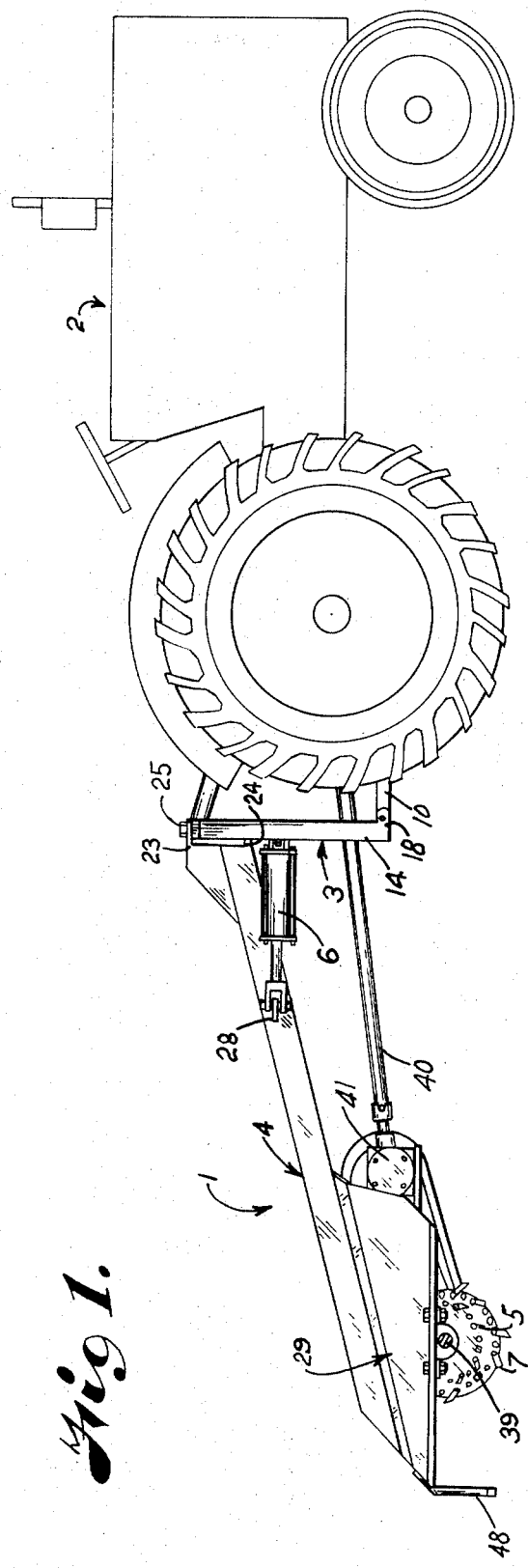
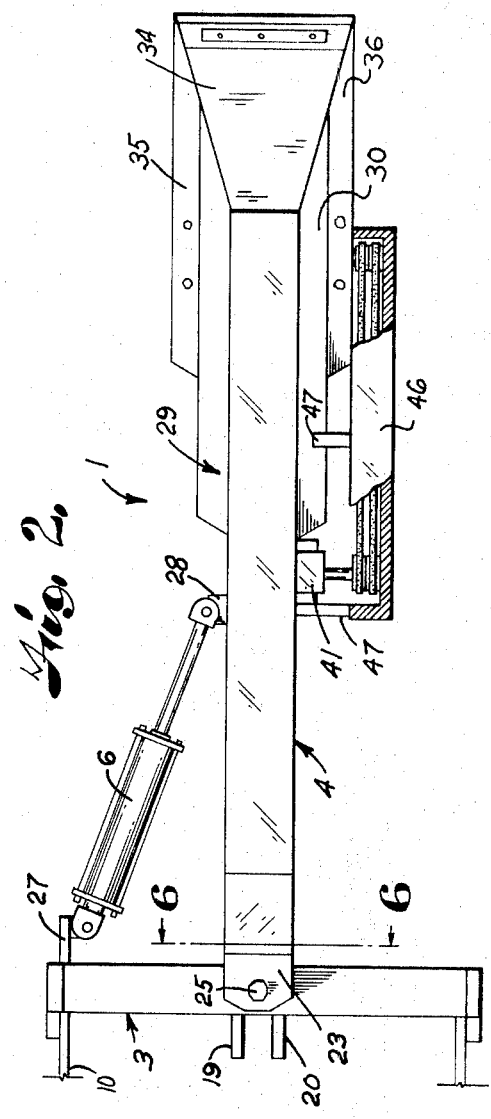
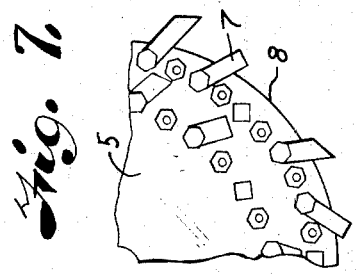

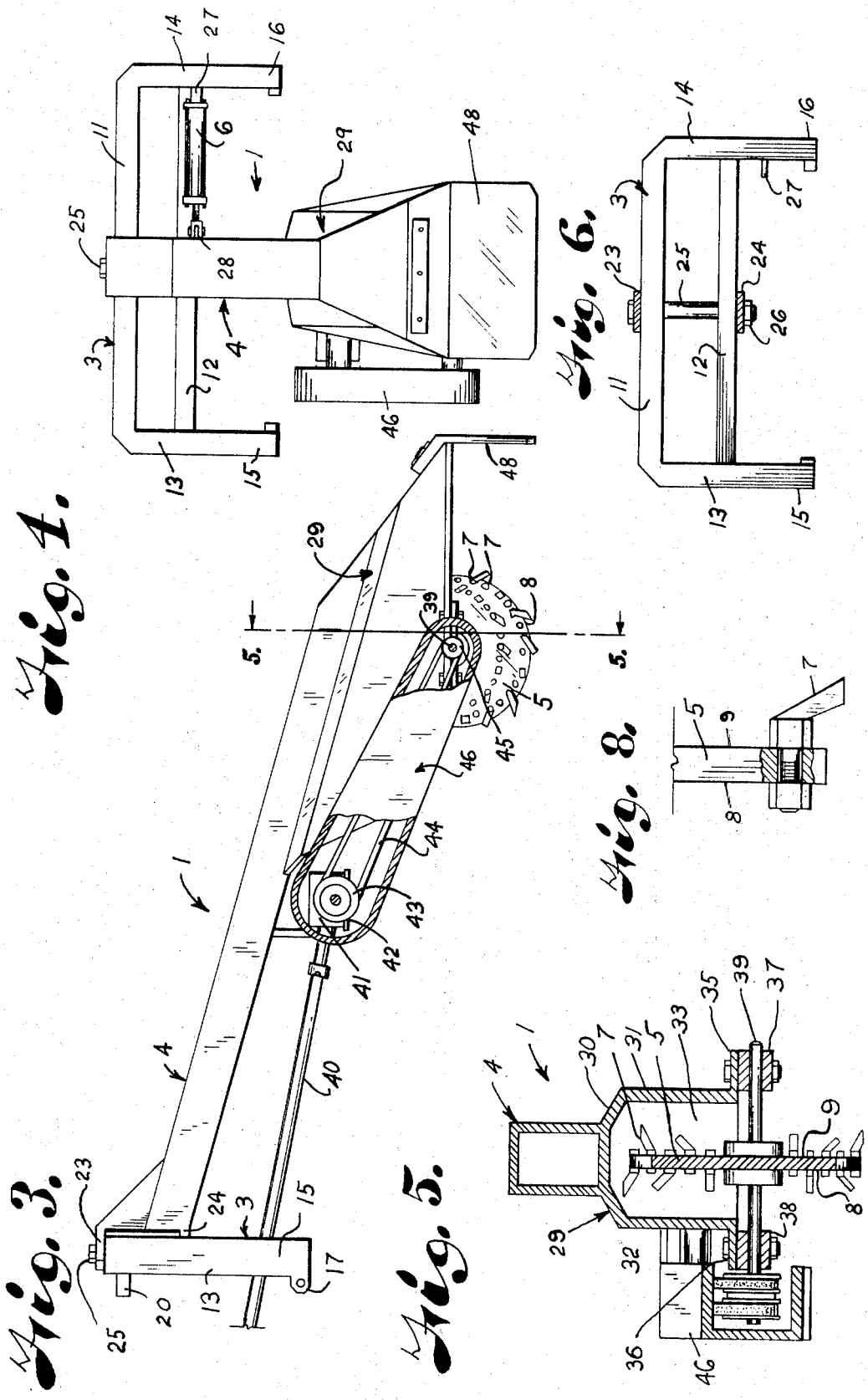

TREE STUMP REMOVING APPARATUS

The present invention relates to tree stump removing apparatus and more particularly to a tree stump removing apparatus for mounting on a prime mover and operative to move a vertical cutting blade laterally during cutting action thereof.

The principle objects of the present invention are: to provide a tree stump removing apparatus having components effective to cut tree stumps while moving laterally or transversely of the tree stump; to provide such a tree stump removing apparatus having a cutting blade rotated while being moved laterally relative to a tree stump to be removed; to provide such a tree stump removing apparatus adapted to adjust the position of a cutting blade during cutting operations therewith; to provide such a tree stump removing apparatus having an upper portion of a cutting blade enclosed within a housing to restrict outwardly movement of sawdust and projectiles, such as nails, rocks, dirt and the like; to provide such a tree stump removing apparatus operatively controlled from the prime mover; and to provide such a tree stump removing apparatus which is effective in operation, economical to manufacture, durable in use, positive in operation, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment illustrating various objects and features of the tree stump removing apparatus of the present invention.

FIG. 1 is a side elevational view of one side of a tree stump removing apparatus embodying features of the present invention.

FIG. 2 is a top plan view of the tree stump removing apparatus.

FIG. 3 is a side elevational view of the other side of the tree stump removing apparatus.

FIG. 4 is an end elevational view of the tree stump removing apparatus.

FIG. 5 is a transverse sectional view taken on line 5—5, FIG. 3 and showing mounting of a wood cutting blade.

FIG. 6 is a transverse sectional view taken on line 6—6, FIG. 2 showing a support frame movably mounted on a prime mover.

FIG. 7 is an enlarged fragmentary side elevational view of the wood cutting blade.

FIG. 8 is a further enlarged edge view of the wood cutting blade showing mounting of cutting elements thereon.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

In the disclosed embodiment of the present invention, the reference numeral 1 generally designates a tree stump removing apparatus for connection to a prime mover 2 and including a support frame 3 which may be mounted on one end of the prime mover 2 and an elongated arm 4 having one end thereof pivotally mounted on the support frame 3 and extending outwardly and downwardly therefrom and having a wood cutting blade 5 rotatably mounted adjacent a free end of the arm 4. An extensible member 6 effects selected swinging movement of the arm 4 and cutting blade 5 thereon in an arc about the one end of the arm 4 during rotation of the cutting blade 5. The cutting blade 5 has a plurality of circumferentially spaced cutting elements 7 on opposite faces 8 and 9 thereof to cut a tree stump (not shown) during swinging movement of the arm 4 about the one end thereof.

The cutting elements 7 are preferably formed of a hard material having a long lasting life and good cutting qualities and adapted to effectively cut wood when being moved toward a side of a tree stump, such as cemented tungsten carbide. It is also preferable that the sides of the cutting elements be ground to selected slopes for proper cutting of the tree stump (not shown).

The cutting blade 5 is illustrated as a circular disc and the cutting elements 7 are mounted in at least one row in circumferentially spaced relation around the periphery of the blade 5. The cutting elements 7 are preferably mounted in a plurality of radially spaced rows with the cutting elements 7 in each row being in circumferentially spaced relation and mounted on respective heads of bolts extending through the cutting blade and having nuts on the other ends as best shown in FIG. 8.

In the illustrated structure, the support frame 3 is suitably mounted on one end of the prime mover 2, as by a suitable three point hitch 10, for up and down movement and for tilting movement to raise and lower a free end of the elongated arm 4 and the wood cutting blade 5 thereon. The support frame 3 has a pair of generally horizontally extending vertically spaced parallel structural members 11 and 12, upper and lower respectively, such as beams, channels and the like. End posts or members 13 and 14 are positioned at respective opposite ends of and are connected to the structural members 11 and 12. The end posts 13 and 14 are also suitable structural members, such as beams, channels and the like, and have end portions 15 and 16 respectively depending from the structural members 11 and 12 to thereby define a generally U-shaped frame.

The support frame 3 has ears 17 and 18 extending from the end portions 15 and 16 respectively adjacent lower ends thereof to receive respective portions of the three point hitch 10. A pair of spaced ears 19 and 20 extend outwardly from one of the structural members, for example the upper structural member 11, and are positioned centrally thereof to receive an extensible portion of the three point hitch 10 whereby the support frame 3 may be tilted about the ears 17 and 18 and raised generally vertically for raising and lowering the elongated arm 4 and the wood cutting blade 5 thereon.

The illustrated pivotal mounting of one end of the elongated arm 4 on the support frame 3 includes centrally positioned and aligned apertures in the upper and lower structural members 11 and 12 respectively. The one end of the elongated arm 4 has spaced flanges 23 and 24 extending therefrom and positioned to engage the structural members 11 and 12. The flanges 23 and 24 have apertures (not shown) therethrough alignable with the apertures to receive a suitable fastening member, such as a bolt 25 having a nut 26 thereon, to define a pivot point for the one end of the elongated arm 4.

The extensible member 6 extends between one of the end posts, for example end post 13, and an intermediate portion of the elongated arm 4 whereby extension and contraction of the extensible member 6 effects a swinging movement of the arm 4 about the bolt 25. In the illustrated structure, the end post 13 has an ear 27 extending outwardly therefrom for pivotally supporting one end of the extensible member 6 and the elongated arm 4 has an ear 28 extending outwardly from one side thereof to pivotally receive the other end of the extensible member 6.

The elongated arm 4 may be any suitable structural shape particularly adapted to resist torsional stresses, such as round or square structural members including pipe. The elongated arm 4 has a housing 29 at the free end thereof to enclose at least an upper portion of the wood cutting blade 5 with the housing being adapted to receive and prevent discharge of sawdust and projectiles, such as rocks, nails and the like, removed in cutting of the tree stump. The housing 29 includes a top plate 30 suitably secured on a lower surface of the structural portion of the arm 4. Side plates 31 and 32 depend from respective opposite side edges of the top plate 30 and are joined by an end plate 33 positioned intermediate the ends of the arm 4 and an inclined or sloping end plate 34 thereby defining an enclosure for an upper portion of the wood cutting blade 5.

The housing 29 provides support for the wood cutting blade 5 and driving means therefor. Flanges 35 and 36 extend outwardly from lower edges of the side plates 31 and 32 for supporting suitable brackets 37 and 38 having suitable bearings therein for rotatably supporting opposite end portions of an axle 39 having the wood cutting blade 5 mounted thereon intermediate the ends thereof.

Rotation of the cutting blade 5 may be effected in any suitable manner, however, rotation of the cutting blade 5 is preferably controlled from the prime mover 2 and in the illustrated structure, a drive mechanism for rotating the cutting blade 5 includes a suitable power take off member 40 operatively connected to the power system (not shown) of the prime mover 2 and operatively connected to a gear unit 41 suitably mounted on a bracket 42 extending from the end plate 33 of the housing 29. The gear unit 41 is operative to effect rotation of a suitable shaft having a suitable pulley 43 mounted thereon. In the illustrated structure, the pulley 43 is a multiple groove for V-belts. A corresponding number of endless belts 44 engage respective grooves of the drive pulley 43 and engage a driven pulley 45 mounted on one end of the axle 39 whereby the power system of the prime mover 2 is operative to effect rotation of the wood cutting blade 5. Suitable controls (not shown) on the prime mover 2 are operative to control operation of the power take off member 40 and thereby rotation of the wood cutting blade 5.

It is particularly desirable to protect the pulleys 43 and 45 and the endless belts 44 extending therebetween, therefore, a generally channel shaped guard 46 is positioned to enclose endless belts 44 and the pulleys 43 and 45. The guard 46 is supported by suitable brace members 47, each having one end secured to the housing 29 and the other end secured to the guard 46.

The wood cutting blade 5 is a generally circular member positioned to rotate in a generally vertical plane and the wood cutting blade 5 has a plurality of the wood cutting elements 7 arranged in circumferential spacing and mounted on the faces 8 and 9 thereof whereby the wood cutting blade is positioned to cut a tree stump (not shown) while moving in an arc about the one end of the elongated arm 4.

In using a tree stump removing apparatus, constructed as illustrated and described, the prime mover 2 is moved to a position having the cutting blade 5 positioned for swinging movement through a tree stump to be removed. The three point hitch 10 is operated to adjust the position of the support frame 3 and thereby the position of the free end of the elongated arm 4 and the cutting blade 5 thereon. The power take off member 40 is operated to rotate the cutting blade 5 and then the extensible member 6 is operated to effect swinging movement of the cutting blade 5 toward and through the tree stump to be removed. The three point hitch 10 is adjusted after each pass through the tree stump to lower the cutting blade 5 whereby a return swing of the elongated arm 4 and cutting blade 5 will effect additional cutting of the tree stump (not shown) to be removed. Particularly for large tree stumps, it will be necessary to adjust the position of the prime mover 2 after a selected number of passes through the tree stump at each location of the prime mover 2. Sawdust, rocks, dirt, nails, and other objects engaged by the cutting blade 5 during the swinging movement through the tree stump are thrown upwardly into the housing 29 and a suitable shield 48 preferably formed of a resilient material, such as rubber is mounted on the inclined end plate 34 to cooperate with the housing 29 for directing the removed substances into a pile adjacent the cutting blade 5.

It is to be understood that while I have illustrated and described one form of my invention, it is not to be limited to the specific form or arrangement of parts herein described and shown.

What I claim and desire to secure by Letters Patent is:

1. A tree stump removing apparatus adapted to be carried on a prime mover having a hitch structure for up and down and tilting movement comprising:
 a. a support frame carried on the prime mover hitch structure and for movement thereby;
 b. an elongated arm extending from and having one end pivotally mounted on said support frame for swinging movement from side to side;
 c. extensible means connected to and extending between said support frame and said elongated arm for moving said arm in said side to side movement in an arc about said one end thereof;
 d. a wood cutting blade rotatably mounted on and positioned adjacent a free end of said elongated arm, said blade including a generally circular disc having opposed faces and rotating in a generally upright position;
 e. a plurality of circumferentially spaced cutting elements mounted on said opposed faces of said wood cutting blade and extending laterally outwardly therefrom, said cutting elements being arranged in a plurality of radially spaced rows on said opposed faces and inclined laterally and radially outwardly therefrom;
 f. said elongated arm having a downwardly opening compartment mounted thereon and positioned to enclose an upper portion of said cutting blade;

g. said support frame and prime mover hitch structure being operably connected for selective raising and lowering of the free end of said elongated arm and the cutting blade thereon to position the cutting blade for a cut in a tree stump;

h. means mounted on said elongated arm and operably connected to said blade for rotating same to cut and thereby remove a tree stump.

2. A tree stump removing apparatus as set forth in claim 1 and including:

a. a plurality of circumferentially spaced apertures extending through the cutting blade;

b. said cutting element being removably mounted on the cutting blade, each of said cutting elements having a shank extending through a respective aperture in said blade with the cutting element extending laterally and radially outwardly relative to the blade;

c. means connected to the shank engaging the cutting blade in opposed relation to the cutting element for securing the cutting element in selected position.

* * * * *